(No Model.)

B. F. MORNINGSTAR.
BELT STRETCHER.

No. 420,462. Patented Feb. 4, 1890.

Witnesses:
Charles R. Searle,
Chas. F. Barter.

Inventor:
B. F. Morningstar
by his attorney
Thomas Drew Stetson

UNITED STATES PATENT OFFICE.

BENJAMIN F. MORNINGSTAR, OF NEW YORK, N. Y.

BELT-STRETCHER.

SPECIFICATION forming part of Letters Patent No. 420,462, dated February 4, 1890.

Application filed May 16, 1889. Serial No. 311,023. (No model.)

*To all whom it may concern:*

Be it known that I, BENJAMIN F. MORNINGSTAR, of New York city, in the county and State of New York, have invented a new and useful Improvement in Belt-Stretching Clamps, of which the following is a specification.

This invention is intended more particularly for stretching large belts, but may be used in smaller sizes, or the same size for stretching small belts. I will assume that the belts are of leather, double thickness, cemented; but they may be of any material and of any thickness. They may be of any width within the compass of the instrument. I provide frames of parallel bars adapted to slide endwise one upon the other. Each is equipped with a clamp for taking hold of the belt near one of the ends, and each is provided with strong rack-teeth on its upper face. Pawls pivoted on one frame engage in the rack-teeth of the other and hold all they get, while another set of pawls worked by a lever pivoted to the lower frame act on the teeth of the upper frame and move it intermittently as the lever is vibrated by the operator.

The accompanying drawings form a part of this specification, and represent what I consider the best means of carrying out the invention.

Figure 1:
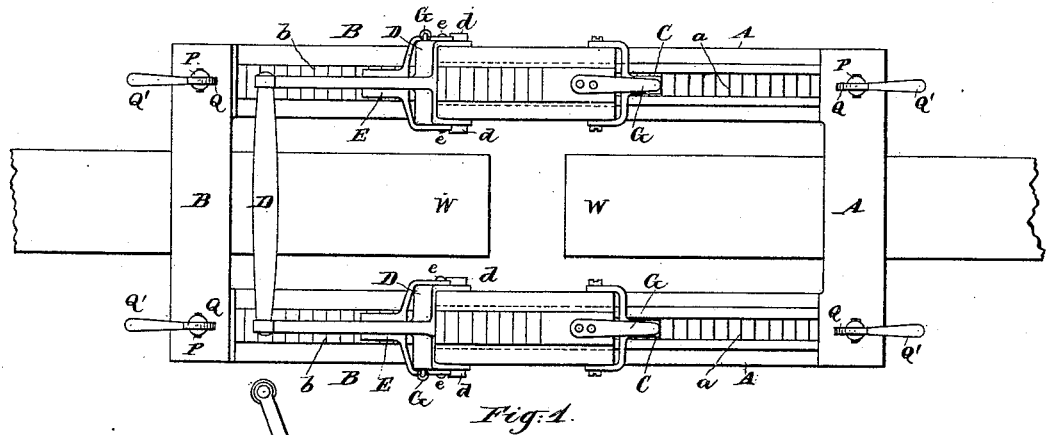
Figure 2:
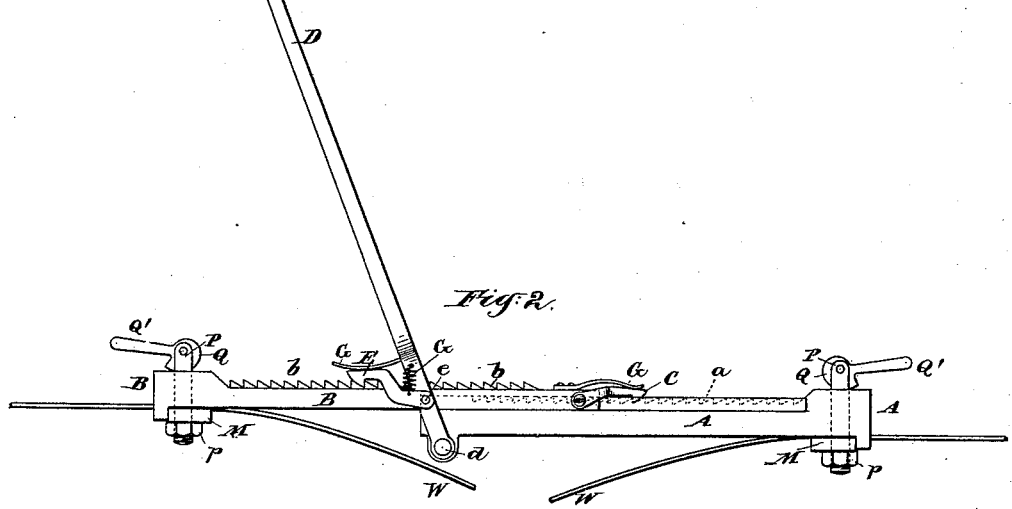
Figure 5:
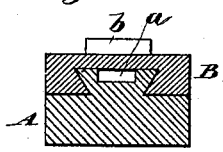
Figure 4:
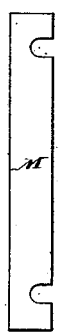
Figure 3:
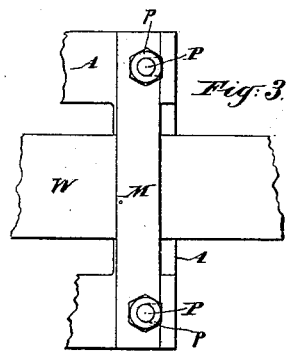

Figure 1 is a plan view. Fig. 2 is a side elevation. Fig. 3 is a plan view of the under side of the portion. Fig. 4 shows a face view of a detail detached. Fig. 5 is on a larger scale. It is a vertical cross-section.

Similar letters of reference indicate corresponding parts in all the figures where they occur.

A and B are two frames adapted to slide one upon the other. On the upper face of the frame A is a wide tongue of dovetail section provided with ratchet-teeth $a$. Pivoted to the ends of the frame B are pawls C, which engage with the teeth $a$. On the upper face of the frame B are a series of ratchet-teeth $b$, as shown. The lower face of frame B has a dovetail groove which receives the tongue of frame A.

D is a frame serving as a lever, composed of two forked arms united by a handle. The lower ends of the forked arms are pivoted to the frame A by means of bolts $d$. There are pawls E, pivoted to the lever D by means of bolts $e$, which pawls engage in the teeth $b$, and as the frame D is vibrated these pawls E draw the frame B intermittently along on the frame A, the hook-pawls C holding the frames in position during the return movement of the lever.

M M are clamping-bars operated by means of bolts P' and cams Q. One end of each bolt is screw-threaded and receives a nut $p$. Turning the cams Q by means of their levers Q' after the nuts $p$ have been adjusted and the belt inserted causes the bars to clamp the ends of the belt marked W. It will be understood that the belt extends around pulleys. (Not shown.)

The pawls C and E are urged into engagement, respectively, by springs G.

To operate the device, the frames A and B are extended, the pawls C and E being lifted to allow such movement. Then the belt W near each end being clamped—one end to the frame A and the other to the frame B—and the pawls being allowed to engage with their respective racks, the lever D is forcibly vibrated, and the two parts of the device slide upon each other in the direction to draw the ends of the belt together. When sufficiently stretched, the ends of the belt are laced or otherwise properly joined together, and the lever D is vibrated and the pawls operated by hand to relax the force. After the strain is off, the clamping-bars may be relaxed by properly turning the cams Q and the clamps disengaged.

I can use two or more pawls of such lengths as to engage at different times in place of the single pawls C and E.

It will be obvious that, if preferred, the clamps may be released by operating the cams Q to let go of the belt without previously relaxing the strain on the belt; or they can be released by unscrewing the nuts $p$. I can dispense with the cams, if desired, in any case.

I claim as my invention—

The frames A and B, arranged to slide one upon the other, provided with clamping-bars M and suitable operating means, and with ratchet-teeth $a\ b$, in combination with the lever D and pawls C and E, arranged to serve substantially as herein specified.

In testimony whereof I have hereunto set my hand, at New York city, this 4th day of May, 1889, in the presence of two subscribing witnesses.

BENJ. F. MORNINGSTAR.

Witnesses:
 ERNEST P. PILSBURY,
 A. H. JONOS.